INVENTORS
HERBERT HARRIS, JR.  EDMUND B. HAMMOND, JR.
WALTER T. WHITE  RAOUL M. GIULIANELLI
BY
ATTORNEY

INVENTORS
HERBERT HARRIS, JR. EDMUND B. HAMMOND, JR.
WALTER T. WHITE  RAOUL M. GIULIANELLI
BY
ATTORNEY

United States Patent Office 2,873,074
Patented Feb. 10, 1959

2,873,074

FLIGHT CONTROL SYSTEM

Herbert Harris, Jr., Rockville Centre, Edmund B. Hammond, Jr., Merrick, Walter T. White, New Hyde Park, and Raoul M. Giulianelli, North Bellmore, N. Y., assignors to Sperry Rand Corporation, a corporation of Delaware Application October 9, 1953, Serial No. 385,224

16 Claims. (Cl. 244—14)

This invention relates to automatic flight control systems for dirigible craft and, particularly, to systems to cause the total craft acceleration to be directed parallel to a reference direction without affecting an initial craft velocity normal to such reference direction.

In the application of lead computing sights to the launching of rocket propelled missiles in air-to-air or air-to-ground combat, it is well established that the angle of attack of the launching aircraft is a significant factor in the determination of the lead angle to be computed. This differs from the situation existing in the computation of lead angles for air-borne machine gun fire wherein, becuse of the relatively high initial velocity of the projectiles and the relatively short ranges involved, the effect of the angle of attack of the aircraft is usually neglected.

In the case of rocket propelled missiles, in order to guide the pilot of the missile launching aircraft along the correct flight path during the release maneuver and to release the missile at the proper time, the lead angle computer must predict the trajectory of the missile during its propulsion period. If the missile is to be uncontrolled during this period, its trajectory depends upon the conditions under which it is launched. Thus, accurate measurements of such quantities as the velocity, angle of attack, rate-of-turn, altitude, etc. of the launching aircraft must continuously be transmitted to the computer prior to the release of the missile in order to arrive at an acceptable lead angle solution. However, the inclusion of the instrumentation necessary to measure these quantities and to incorporate them in the lead angle computation greatly increases the complexity, weight and size of the lead angle computer. In addition, certain of these quantities, particularly the quantity angle-of-attack, cannot conveniently be measured in high speed aircraft with sufficient accuracy to minimize missile dispersion to the degree required to be tactically effective.

Therefore, it is proposed that the missile be controlled during its flight by an automatic pilot which receives control signals from instrumentation within the missile, whereby the missile trajectory is influenced to a lesser degree by the launching conditions, air gusts, mechanical misalignments of the missile air frame, or misalignment of the motor thrust. By the use of such an automatic pilot, the missile dispersion can be reduced and the process by which the computer determines the missile trajectory can be simplified.

Assuming that the missile autopilot is ideal in that its transient errors remain essentially zero, it is possible to steer the missile along one of the several types of trajectories. For example, neglecting the effect of gravity upon the missile trajectory, the missile may be caused to fly a straight path in the direction of either its velocity vector or its heading at the time of release by the use of adaptations of conventional automatic pilots. However, it can be shown that each of such courses would result in large miss distances in certain tactical situations if the angle of attack of the launching aircraft at time of release is not taken into account. Thus, to be practical from a tactical standpoint, either of such types of automatic pilots should include means to determine the angle of attack and to incorporate a measure of such quantity in the flight path solution.

A third type of missile trajectory has been found to be particularly adapted to this situation, and constitutes the flight path on which the present invention is based. Specifically, and again neglecting the gravity effect, it can be shown that if the component of the missile velocity crosswise to its launching direction and resulting from the angle of attack of the launching aircraft is maintained constant throughout the flight of the missile, the quantity angle-of-attack need not be taken into account in the lead-angle computation and the missile can be caused to follow a flight path such that it arrives substantially on the sight line between the launching aircraft and the target at the end of a predetermined period. This result is obtained by controlling the missile in such a manner that the total missile acceleration vector remains parallel to the missile heading at the time of release, whereby the missile travels a parabolic trajectory (assuming the missile acceleration to be constant) which is tangent to the velocity vector of the launching aircraft at the time of release. Briefly, this is accomplished by measuring accelerations relative to the missile air frame by means of linear accelerometers, combining a function of such accelerations with a function of a measure of angular deviation from a reference direction obtained from a free gyroscope, and rotating the missile longitudinally about its center of gravity in accordance with such combined functions, whereby accelerations crosswise to the longitudinal axis of the missile are essentially reduced to zero and the total missile acceleration is directed parallel to the reference direction.

The principal object of the present invention is to improve the characteristics of automatic flight control systems for use in rocket propelled missiles whereby the hit probability of such missiles is increased and the process by which the missile launching computer determines the missile trajectory is simplified, and whereby the missile is controlled in a manner such that its total acceleration vector remains parallel to the missile heading at the time of release so that the missile travels a parabolic trajectory which is tangent to the velocity vector of the launching aircraft at the time of release. A further object of the invention is to provide a flight control system to produce signals proportional to the angular relationships of total craft acceleration and craft heading to a reference direction and to apply such signals to deflect a control surface such that the total craft acceleration is directed parallel to a reference direction. A further object of the invention is to provide a flight control system for a rocket propelled missile to zero out all missile accelerations normal to a reference direction in a manner such that the distance the missile travels perpendicular to the reference direction can be determined from the initial velocity of the missile in the given direction and the duration of the propulsion period. Other objects of the invention will be apparent from the following specification.

The invention is shown in the appended drawings, in which.

A typical situation in which the present invention may be employed is outlined in copending application Serial No. 244,761, filed September 1, 1951, in the name of E. B. Hammond, wherein there is disclosed a missile guidance system for use by fighter aircraft to control the launching and guidance of rocket propelled missiles against enemy aircraft. In general, in the tactical operation of this system, the fighter aircraft is directed to intercept a target by a long-range, fighter-director, radar system until the target is within range of the fighter's radar. At this point the fighter commences its attack which comprises tracking the target, launching the missile in accordance with calculations made by a computer, and guiding the missile on its radio tracking beam to within lethal range of the target where it is detonated by a proximity fuse.

The missile employed in this system is an air-to-air boost-glide, beam rider type missile having variable incidence wings or control surfaces that are actuated by a hydraulic servo system to provide yaw, pitch and roll control in accordance with intelligence transmitted through the fighter's target tracking beam. In operation, the missile is launched in a direction parallel to the longitudinal axis of the fighter at a subsonic velocity and is accelerated to a supersonic velocity by means of a rocket motor. At the end of the boost or rocket burning period it has sufficient velocity to glide the remaining distance to the target.

As a general proposition, it is possible to provide radio guidance for the missile from the instant it is launched until it arrives at its target. However, the flame and combustion products of the rocket motor would cause attenuation and modulation of the radar beam whereby spurious control signals would be received by the missile. These signals would cause unnecessary and unwanted actuations of the missile control surfaces whereby (1) the limited supply of energy stored in the missile to operate the control surfaces would be unduly depleted, and (2) the increased drag caused by control surface and body oscillations would reduce the net velocity gain, and, consequently, reduce the missile glide time.

In view of the stringent size and weight limitations of such missiles it is impractical to increase the size of the energy storage device or the rocket motor to compensate for such losses. Therefore, it is preferred that the missile travel without external guidance during the propulsion period of its flight, and that its beam rider receiver be energized to accept guidance signals from the fighter only after the rocket motor burning is completed.

However, as described in the above mentioned application, the launching maneuver is basically a prediction problem. The computing device in the fighter is adapted to predict the future positions of the target and fighter and cause the missile to be launched in such a manner that at the end of the motor burning period the missile is on the sight-line (tracking beam) between the fighter and the target. To design a computer to accomplish this function it is essential that the end point of the missile trajectory be known either (1) as a function of the launching conditions, if no other control is used, or (2) as a function of a prescribed flight path, if a flight control system in the missile is used.

Obviously, the first alternative would be preferable since it would simplify the control system required in the missile. However, it can be shown that the slight misalignments of the rocket motor, wings, and missile frame that can be expected from practical manufacturing techniques, as well as the wind gusts that can be expected in flight, would result in a missile dispersoin of such magnitude that the end point of the trajectory cannot be predicted with the desired degree of accuracy. Therefore, it is essential that the missile be provided with a flight control system to cause it to travel a prescribed flight path whereby the end point of its trajectory is known with sufficient accuracy for use in the launching computation.

Heretofore, a number of automatic flight control systems have been proposed for operating one or more control surfaces of a dirigible craft, such as the rudder, elevator or ailerons of an aircraft, whereby the craft may be returned to a predetermined course, or attitude, or altitude, after a deviation therefrom. In many of the systems of this type, the required deflection of the control surface is determined at any instant not only by the deviation of the craft from such predetermined course, attitude, or altitude, but also by one or more additional control quantities dependent upon the angular rates of movement of the craft. Specifically, control systems have been proposed in which the total control quantity comprises terms corresponding to the deviation, the angular velocity and the angular acceleration of the craft. However, such systems are intended primarily for use in aircraft travelling at substantially constant velocities and are not suitable for the control of missiles during constant accelerations. Furthermore, none of such systems are intended or adapted to permit a continuance of a crosswise velocity of the controlled craft such as that imparted to the present missile as a result of the angle of attack of the fighter.

In a system such as that disclosed in the above mentioned application, the missile is launched from the fighter with certain initial conditions of which one is an initial velocity in a direction perpendicular to the missile axis at time of launching, i. e., the crosswise velocity resulting from the angle of attack of the fighter. If the missile axis at the time of launching is considered as the reference direction, then the missile trajectory can be determined to a good approximation for use in the lead angle computer if the distance the missile travels perpendicular to the reference direction can be determined as a product of the initial velocity perpendicular to the reference direction and the duration of the propulsion period. Thus, the problem is to zero out all accelerations perpendicular to the reference direction (missile axis at instant of launching) in a manner such that the distance the missile travels perpendicular to the reference direction can be determined from the initial velocity in the given direction and the duration of the propulsion period.

The best solution to the above problem can be defined, as follows:

If $v_i$ = initial component of velocity in ft./sec. crosswise to reference direction, $\Delta t$ = duration of propulsion period in seconds, and $s$ = distance travelled crosswise to reference direction in time $\Delta t$ Then, in the absence of all crosswise components of acceleration:

$$s = v_i \Delta t$$

However, in practice, a variety of factors tend to change the magnitude of the initial crosswise velocity. If the displacement error caused by these factors is represented as $\Delta s$, then the actual crosswise distance travelled may be defined as:

$$s' = v_i \Delta t + \Delta s$$

Thus, the function of the proposed automatic pilot that is to control the missile during its propulsion period is to minimize or eliminate the effect of such factors that contribute to the error represented by $\Delta s$.

The factors which tend to change the magnitude of the initial crosswise velocity are motor thrust misalignment, missile body and wing misalignment, initial conditions of angle of attack and angular velocity of the missile, and random gusts. The misalignments, in general, have two undesirable effects, namely they produce forces normal to the missile or produce moments about the missile, i. e., moments which must be balanced by the missile weathercock stability. The resulting angle of attack also produces a force which tends to accelerate the missile crosswise to the reference direction.

Although the initial conditions result in forces accelerating the missile normal to the reference direction, their effect is not constant, as in the case of misalignments, since the weathercock stability of the missile tends to reduce them to zero. However, this statement in no way implies that they are less undesirable than fixed misalignments.

Figure 1:
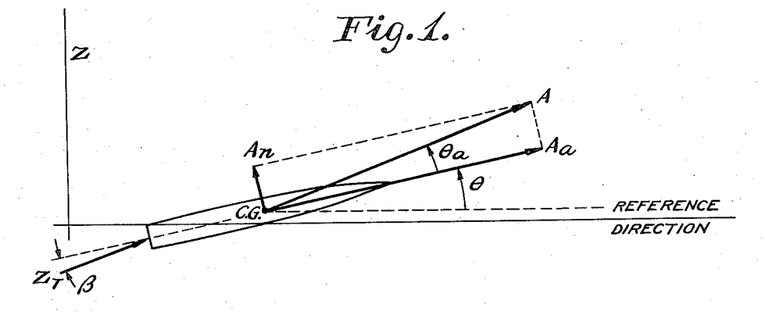
Fig. 1 is an acceleration diagram for an uncontrolled missile.

In principle, the control system of the present invention operates to maintain the total missile acceleration vector parallel to a reference direction. If the reference direction is taken as the missile longitudinal axis at the instant of launching, the control principle can be outlined by reference to Fig. 1 which is an acceleration diagram for an uncontrolled missile at some arbitrary time after launching when the longitudinal axis of the missile makes an angle $\theta$ with the reference direction. For purposes of the following discussion, the Z direction is that direction in which the accelerations are to be made zero. With the several factors that contribute to produce missile accelerations represented as a resultant thrust vector $Z_t$ that is misaligned with the missile longitudinal axis by an angle $\beta$, two components of acceleration act on the missile, namely, $A_n$, perpendicular to the longitudinal axis, and $A_a$, parallel to the longitudinal axis. The resultant total acceleration vector A then makes an angle $$\theta_a = \tan^{-1} A_n / A_a \qquad (1)$$

with respect to the missile longitudinal axis.

Figure 2:
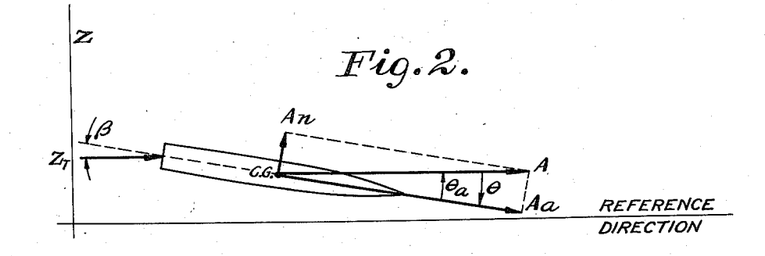
Fig. 2 is an acceleration diagram for a controlled missile.

If the missile flight control system is arranged to combine the total acceleration angle $\theta_a$ with the missile displacement angle $\theta$, and to position a control surface such that $$\theta + \theta_a = 0 \qquad (2)$$

then the control principle may be stated: rotate the missile through an angle $\theta = -\theta_a$, as shown in Fig. 2, such that the total missile acceleration is directed parallel to the reference direction during flight, thereby achieving the purpose of the flight control system which is to zero all accelerations crosswise to the reference direction.

The control equation resulting from Equations 1 and 2 is:

$$-\delta = G(\theta_a + \theta)$$
$$= G(\tan^{-1} A_n / A_a + \theta) \qquad (3)$$

where $\delta$ is the control surface deflection in radians, and G is a constant proportional to a feedback sensitivity in radians/radian.

Figure 3:
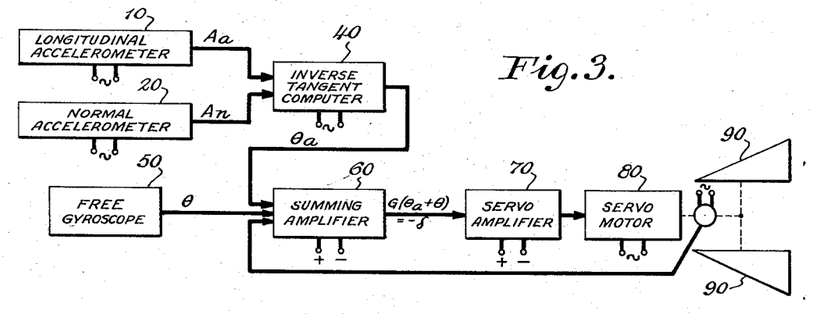
Fig. 3 is a schematic diagram of a circuit embodying the control principle of the invention.

A typical embodiment of a missile flight control structure to implement the above control equation is disclosed schematically in Fig. 3 and includes two accelerometers 10 and 20 which are arranged preferably at the nodal point of the missile, i. e., at the point at which they are least affected by turning movements of the missile. Specifically, accelerometer 10 is arranged to detect accelerations $A_a$ along the longitudinal axis of the missile and to produce electrical signals proportional thereto, and accelerometer 20 is arranged at right angles to accelerometer 10 to detect accelerations $A_n$ normal to the longitudinal axis of the missile and to produce electrical signals proportional thereto. The outputs $A_a$ and $A_n$ of accelerometers 10 and 20 are fed to an inverse tangent computer 40, described below, wherein they are employed to produce a signal $\theta_a$ proportional to the angle of displacement of the total acceleration vector relative to the longitudinal axis of the missile.

Arranged preferably at the center of gravity of the missile is a free gyroscope unit 50, described in more detail below, that includes a suitable caging device to maintain the spin axis of the gyroscope parallel to the longitudinal axis of the missile while it is carried by the fighter aircraft. The gyroscope is uncaged as an incident of the missile launching operation whereby, in flight, its spin axis maintains a direction in space, or reference direction, corresponding to the longitudinal axis of the missile at the instant of launching. Suitable pickoff means are provided to measure the angular displacement $\theta$ of the longitudinal axis of the missile relative to the reference direction during the flight of the missile and to produce an electrical signal proportional thereto.

The signals $\theta_a$ and $\theta$, from inverse tangent computer 40 and free gyroscope 50, respectively, are combined and amplified in a summing amplifier 60 having a relatively high gain proportional to G whereby the output of the amplifier is proportional to $G(\theta_a + \theta) - \delta$, the required control surface deflection. This signal is then applied in conventional manner to a servo amplifier 70 which controls the operation of a servomotor 80 to actuate a control surface 90 through the required deflection angle $\delta$. Thus, there is provided a missile flight control system that functions to counteract accelerations normal to the longitudinal axis of the missile to cause the total missile acceleration to be directed parallel to the reference direction, but does not affect the crosswise velocity of the missile, imparted thereto as a result of the angle of attack of the fighter aircraft at the instant of launching, whereby the missile flies a parabolic trajectory which is tangent to the velocity vector of the fighter aircraft at the time of release.

Figure 4:
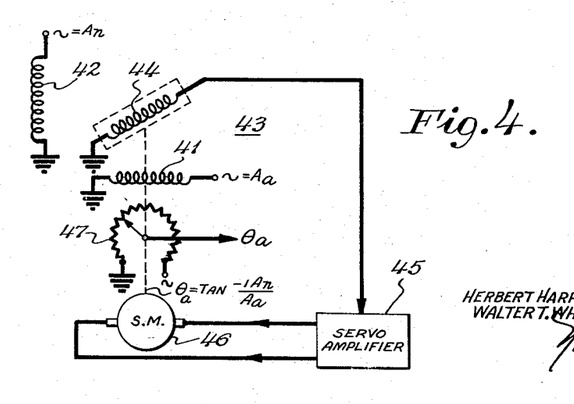
Fig. 4 is a diagram of an inverse tangent computer.

The inverse tangent computer 40 may comprise any suitable device for this purpose but is preferably of the type disclosed in Fig. 4 wherein the accelerometer voltages $A_a$ and $A_n$ are applied to excite the stator windings 41 and 42, respectively, of a dual function resolver 43. The resulting voltage induced in rotor winding 44 is fed to a servo amplifier 45 that causes a servomotor 46 to turn resolver rotor 44 through an angle $\theta_a$ to a null position. The equation solved by this arrangement, in terms of the production of sine and cosine values, can be written:

$$A_n \cos \theta_a - A_a \sin \theta_a = 0$$

or $$\theta_a = \tan^{-1} A_n / A_a \qquad (4)$$

The mechanical rotation of the drive shaft of servomotor 46, representing the value $\theta_a$, is converted to an electrical signal suitable for use in amplifier 60 by means of a potentiometer 47 having its wiper arm mounted on the servomotor drive shaft.

It may be noted that the ideal solution of Equation 2 would require an infinite gain in the circuit. Thus, in practice, a certain error must be expected unless integral control is employed, such, for example, as the velocity servo integrator disclosed in Fig. 4.29 of Electronic Instruments (first edition) by Greenwood, Holden and MacRae (vol. 21 of the M. I. T. Radiation Laboratory Series). However, by the use of the high gain amplifier 60, the error may be held to an acceptably small percentage value.

Thus far, the application of the basic control principle has been limited to counteract the effect of accelerations occurring in a single plane. However, it is apparent that the same principle is equally applicable to counteract the effect of any acceleration to which the missile may be subjected. A flight control system for this purpose is disclosed in Fig. 5 wherein an accelerometer 10 is arranged, as above, to detect accelerations $A_a$ along the longitudinal axis of the missile, and accelerometers 20 and 30 are arranged, respectively, to detect the vertical ($A_{nv}$) and horizontal ($A_{nh}$) components of accelerations normal to the longitudinal axis. Obviously, there may be any desired orientation of accelerometers 20 and 30 provided that suitable resolving means are included to determine the pitching and yawing components of the normal accelerations. For simplicity herein it is considered that accelerometer 20 is arranged parallel to the Z- or yaw axis of the missile and that accelerometer 30 is arranged parallel to the Y- or pitch axis of the missile.

Figure 5:
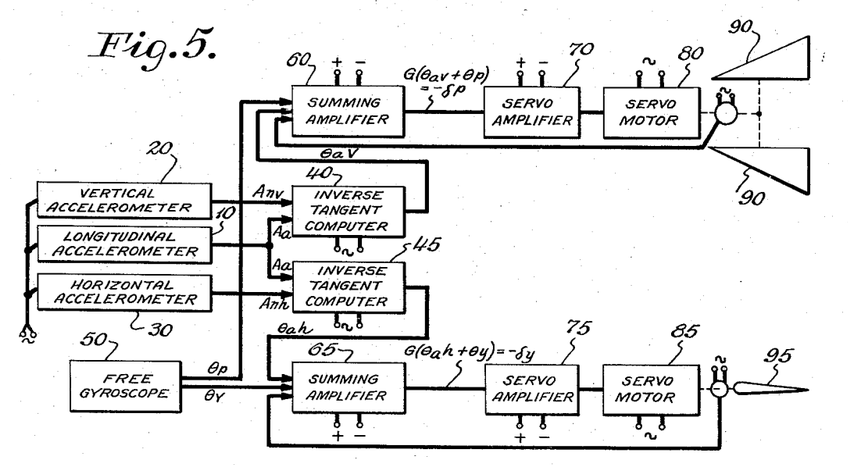
Fig. 5 is a schematic diagram of a missile flight control system embodying the control principle of the invention.

In this arrangement the outputs $A_a$ and $A_{nv}$ of accelerometers 10 and 20 are fed to inverse tangent computer 40, as above, wherein they are used to produce a signal $\theta_{av}$ proportional to the vertical component of the angle of displacement of the total acceleration vector relative to the longitudinal axis of the missile. This signal and the pitch component $\theta_p$ of the angular displacement of the longitudinal axis of the missile relative to the reference direction, as obtained from free gyroscope 50, are combined and amplified in summing amplifier 60 to produce the required pitch control signal $G(\theta_{av}+\theta_p)$. The latter signal is fed to servo amplifier 70 to control the operation of servomotor 80 to actuate missile control surfaces 90, which correspond to the elevators of a conventional aircraft, through the required deflection angle $\delta_p$.

Similarly, the outputs $A_a$ and $A_{nh}$ of accelerometers 10 and 30 are fed to inverse tangent computer 45 to obtain a signal $\theta_{ah}$ proportional to the horizontal component of the angle of displacement of the total acceleration vector relative to the longitudinal axis of the missile. This signal and the yaw component $\theta_y$ of the angular displacement of the longitudinal axis of the missile relative to the reference direction, obtained from gyroscope 50, are combined and amplified in summing amplifier 65 to produce the required yaw control signal $G(\theta_{ah}+\theta_y)$. The latter signal is fed to servo amplifier 75 to control the operation of servomotor 85 to actuate missile control surface 95, which corresponds to the rudder of a conventional aircraft, through the required deflection angle $\delta_y$.

By this arrangement there is provided a missile flight control system for general application that functions to correlate the various acceleration forces to which the missile is subjected in a manner to counteract accelerations normal to the longitudinal axis of the missile and thereby cause the total missile acceleration to be directed parallel to a reference direction, but permits the missile to maintain the velocity imparted thereto as a result of the angle of attack of the fighter aircraft at the instant of launching, whereby the missile is caused to fly a parabolic trajectory that is tangent to the velocity vector of the aircraft at the time of release.

The description, thus far, is directed to the application of the invention to the general problem of providing a flight control system for missiles in which it is considered that the longitudinal and normal acceleration forces acting on the missile are independently variable and may be of any relative magnitude. In practice, the acceleration produced by the rocket motor greatly exceeds any combination of normal acceleration forces to which the missile may be subjected, and the relation of the acceleration forces may be expressed as $$A_a \gg A_n \quad (5)$$

Thus, the angle formed by the total acceleration vector and the longitudinal axis of the missile will always be small, and Equation 3 may be expressed as $$-\delta = G(A_n/A_a+\theta) \quad (6)$$

or, $$= G/A_a(A_n+A_a\theta) \quad (7)$$

Equation 7 indicates that the longitudinal accelerometer voltage must be employed as a multiplier for the free gyroscope output and as a divisor for the constant G in order to supply the necessary components of the control signal. Although these operations can be performed with less complex devices than the inverse tangent computer discussed above, a further simplification is preferable in order to keep the weight and size of the flight control system at a minimum.

To this end, extensive flight tests disclosed that the acceleration force provided by a rocket motor is substantially constant throughout the burning period. Thus, the expression $G/A_a$ may be representend as a constant $G_a$ proportional to feedback or accelerometer sensitivity in radians/ft./sec.$^2$, and Equation 7 may be expressed as $$-\delta = G_a(A_n+A_a\theta) \quad (8)$$

or, since $G_aA_a$ may also be represented as a constant $G_\theta$, as $$-\delta G_aA_n+G_\theta \quad (9)$$

wherein $G_\theta$ is a feedback sensitivity in radians/radian, and is the product of the accelerometer sensitivity $G_a$ and the assumed value of the longitudinal acceleration.

Thus, the basic control principle, as simplified in Equation 9, can be implemented by the use of a free gyroscope to measure the angle between the reference direction and the longitudinal axis of the missile, an accelerometer device to measure accelerations normal to the longitudinal axis of the missile, suitable amplifying devices to provide the required constants of multiplication, and means to combine the amplified voltages to produce the control signals required to actuate the missile control surface, whereby the missile will travel a parabolic trajectory that is tangent to the velocity vector of the launching aircraft at the time of release. By this arrangement it is not required to provide a longitudinal accelerometer, nor to provide means to effect inverse tangent computation or multiplication of two variable voltages, as in the preceding forms of the invention. However, in practice, it is expedient to include a rate term in the computation of the control signal in all forms of the invention, in conventional manner, in order to damp body oscillations of the missile. When this is done, the final control equation may be expressed as:

$$-\delta = G_aA_n+G_\theta\theta+G_{\dot\theta}\dot\theta \quad (10)$$

When it is desired to control a missile about its yaw and pitch axes, as described above in connection with Fig. 5, the general expression of Equation 10 may be represented as $$-\delta y = G_aA_{nh}+G_\theta\theta_y+G_{\dot\theta}\dot\theta \quad (11)$$

and $$-\delta p = G_aA_{nv}+G_\theta\theta_p+G_{\dot\theta}\dot\theta_p \quad (12)$$

wherein $\delta y$ and $\delta p$ are the required deflections of the missile yaw and pitch control surfaces, respectively; $A_{nh}$ and $A_{nv}$ are the horizontal and vertical components, respectively, of accelerations normal to the longitudinal axis of the missile; $\theta_y$ and $\theta_p$ are the yaw and pitch components, respectively, of the angular deviation of the longitudinal axis of the missile from the reference direction; and $$\dot\theta_y \text{ and } \dot\theta_p$$

are the yaw and pitch components, respectively, of the angular rate of such deviation.

Figure 6:
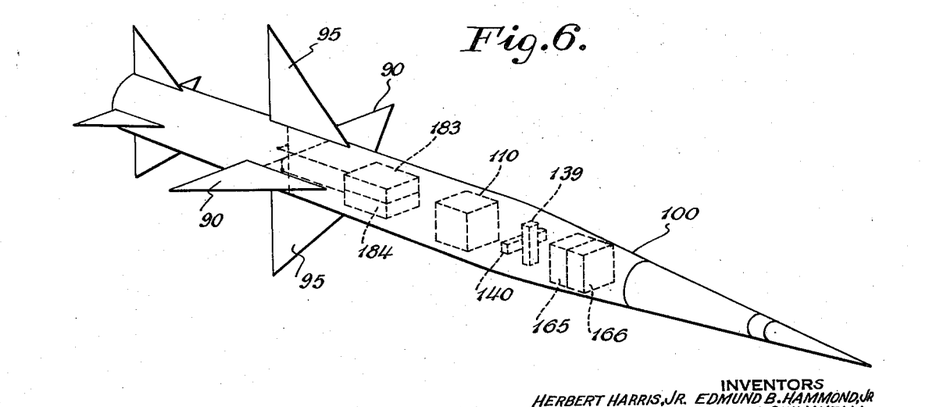
Fig. 6 is a perspective view of the several elements of the invention in a typical arrangement in a missile.
Figure 7:
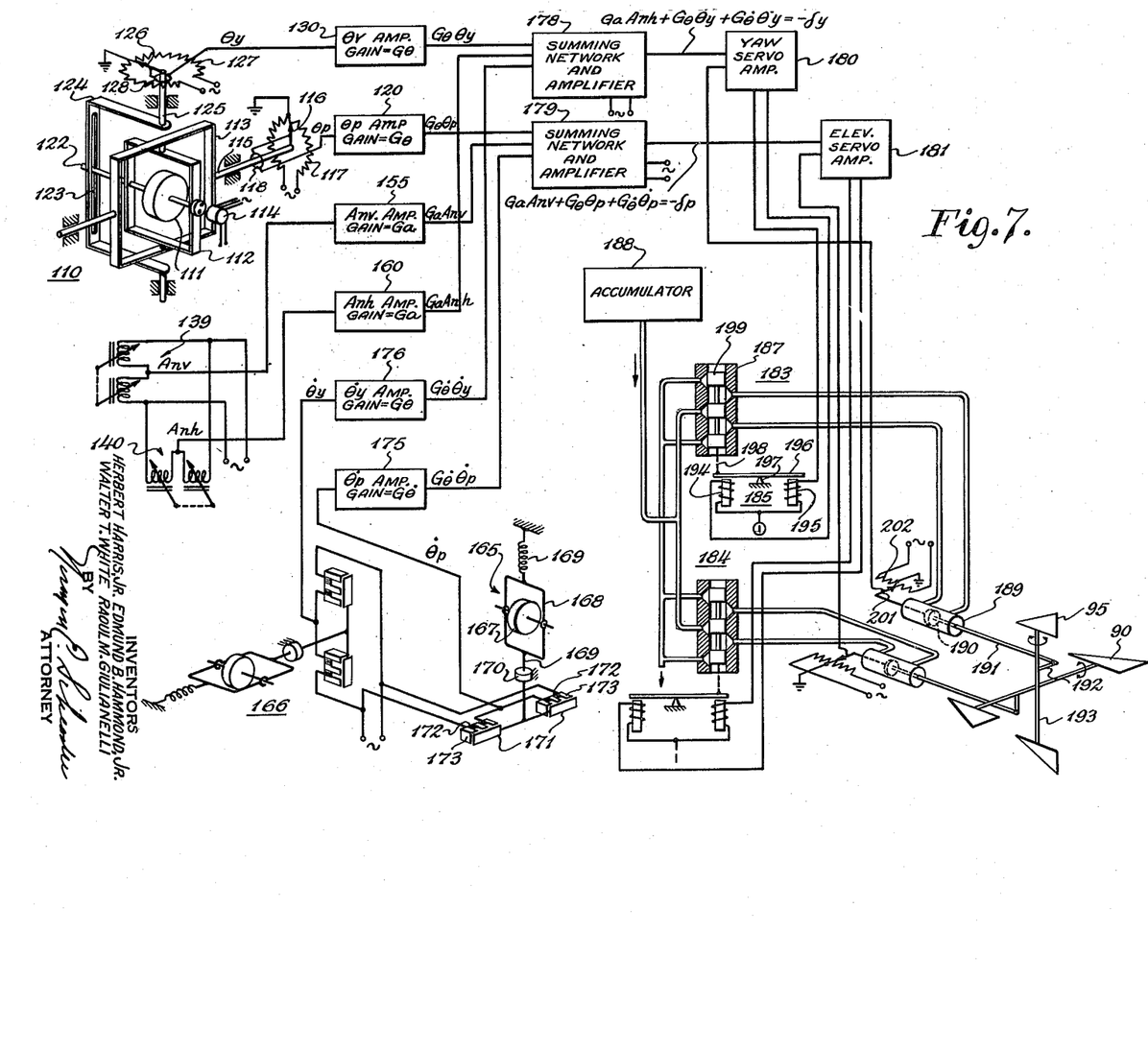
Fig. 7 is a schematic diagram of a circuit embodying a preferred form of the invention.

A missile flight control system to implement control Equations 11 and 12 is disclosed, in a preferred embodiment of the invention, in Figs. 6 and 7 wherein it is arranged to control a typical missile structure 100 having a pair of interconnected, pivotally mounted wings or control surfaces 95 to effect turning movement the missile in yaw and a similar pair of control surfaces 90 to effect turning movement in pitch.

In order to determine the angular deviation of the longitudinal axis of the missile from a reference direction, the control system includes a free gyroscope unit 110, located preferably at the center of gravity of the missile, having a rotor 111 arranged with its spin axis parallel to the longitudinal axis of the missile. Rotor 111 is supported by pivotally mounted gimbals 112 and 113 to permit movement of the rotor relative to the yaw and pitch axes of the missile, and is provided with suitable pickoff means to measure such movement.

Prior to launching the missile from the supporting aircraft, the gyroscope is held by a pin type caging device 114, described below, such that its rotor spin axis is parallel to the longitudinal axis of the missile. As an incident of the launching operation, the rotor is brought to operational speed, and, at the instant of launching, the caging device is released by the aircraft pilot in operating the missile launching mechanism. Then, because of its gyroscopic stability, the spin axis of rotor 111 maintains a direction in space, or reference direction, that corresponds to the direction in space of the longitudinal axis of the missile at the instant of launching.

To obtain a measure of angular deviation about the pitch axis, the trunnion of gimbal 113 is provided with an extension 115 on which is fixed a spring-wire wiper arm 116 of a carbon-type potentiometer 117 that is secured to the missile frame and is energized from a suitable A.-C. source in the missile and is center-tapped to ground. In the caged position of rotor 113, wiper arm 116 engages the center-tapped portion of the potentiometer and no signal is produced. When the rotor is uncaged, any deviation of the missile axis in pitch from the reference direction results in a movement of wiper arm 116 on potentiometer 117 to produce a signal proportional to $\theta_p$ that varies in phase and amplitude in accordance with the direction and extent of the movement of arm 116. This signal is fed through slip ring assembly 118 to an amplifier 120 having a gain of $G_\theta$, whereby the output of the amplifier is proportional to $G_\theta \theta_p$.

Angular deviations about the missile yaw axis are measured in a similar manner by means of an extension 122 on gimbal 112 that is aligned with the spin axis of rotor 111 and engages a slot 123 in a pivotally mounted bail ring 124. An extension 125 on the bail ring is provided with a wiper arm 126 that engages a potentiometer 127, energized in the same manner as potentiometer 117, so that a voltage signal proportional to $\theta_y$ is produced in accordance with the direction and extent of movement of arm 126. This signal is fed through slip ring assembly 128 to an amplifier 130 that also has a gain of $G_\theta$, whereby the output of the amplifier is proportional to $G_\theta \theta_y$.

Caging device 114 (see also Fig. 8) includes a cylindrical caging member 131 that is fixed on an armature 132 of a solenoid 133 that is suitably mounted on gyro housing 134. The forward end of member 131 is provided with a recess 135 that is adapted to engage a pin 136 that is fixed in a contact block 137 that is mounted on gyro gimbal 112. When solenoid 133 is de-energized, leaf spring 138 urges armature 132 to the right in Fig. 8 to engage recess 135 with pin 136 and thereby cage the gyro rotor about its axis. When solenoid 133 is energized, armature 132 is moved to the left thereby disengaging recess 135 from pin 136. A suitable spring urged latching device 151 serves to retain armature 133 in its leftward position until manually disengaged.

Figure 8:
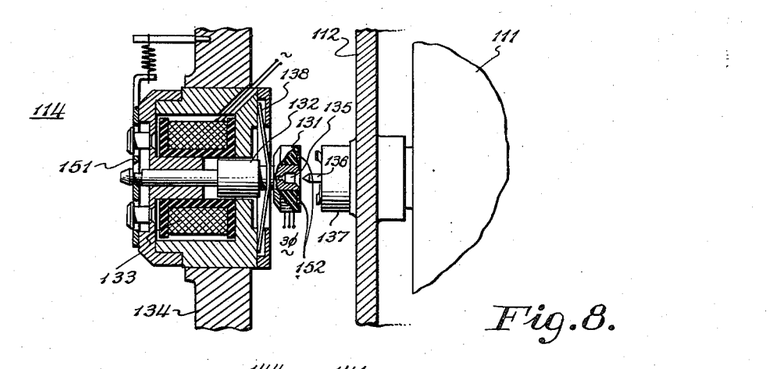
Fig. 8 is a sectional view of the gyroscope caging mechanism.

When the missile is prepared for operational use, the gyro is manipulated to permit recess 135 to engage pin 136 whereby rotor 111 is locked to housing 134 to maintain its spin axis aligned with the longitudinal axis of the missile. In order to bring rotor 111 to operating speed, driving power is applied by the aircraft pilot when preparing for a launching operation, through contacts 152 in caging member 131 that mate with corresponding contacts in contact block 137. At the instant of launching, solenoid 133 is energized, through suitable switches (not shown) from the pilot's launching trigger, to disengage member 131 from pin 136, whereby driving power to the gyro is cut off and the gyro is uncaged. During the brief period of powered flight of the missile, rotor 111 coasts at operating speed whereby its spin axis maintains a direction in space, or reference direction, that is parallel to the longitudinal axis of the missile at the instant of launching.

To obtain measures of the components of the acceleration forces normal to the missile longitudinal axis, the system includes an accelerometer unit that is located substantially at the nodal point of the missile and comprises two linear accelerometers that are arranged perpendicular to each other and perpendicular to the missile longitudinal axis. Specifically, an accelerometer 139 (Figs. 6 and 7) is arranged with its sensitive axis substantially coincident with the missile yaw axis to detect the vertical acceleration component $A_{nv}$, and an accelerometer 140 is arranged with its sensitive axis substantially coincident with the missile pitch axis to detect the horizontal acceleration component $A_{nh}$.

Accelerometers 139 and 140 are identical in construction and include an inertial mass 141 (see also Fig. 9) suspended by two circular spring diaphragms 142, 143 mounted in a cylindrical body portion 144. At each end of mass 141 is fastened a high-permeability iron pad 145, 146 each of which is separated by a small air gap from an associated inductance coil 147, 148 that is wound on an adjustable core member 149, 150 screwed into its respective end of body portion 144. Each accelerometer is filled with a damping fluid having restricted movement through small holes in diaphragms 142, 143 to provide damping for the diaphragms and mass 141.

Figure 9:
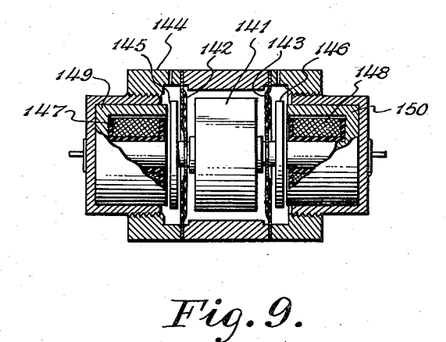
Fig. 9 is a sectional view of an accelerometer.

By the arrangement thus far described, each combination of elements 145, 147, 149, and 146, 148, 150, forms an independent magnetic circuit when coils 147 and 148 are suitably energized. Thus, any acceleration applied to the missile that causes a deflection of mass 141 results in a change in the air gap relationships, whereby the reluctances in the magnetic paths and the inductances of coils 147 and 148 are varied in accordance with such deflection.

Coils 147 and 148 of each accelerometer are connected in series to a suitable A.-C. source in the missile and the positions of core members 149 and 150 are adjusted so that, at zero acceleration, the inductances of the coils are equal and opposite and the voltage output from the junction of the coils is zero. Coils 147 and 148 are also adjusted so that the opposite inductances vary symmetrically when accelerations are applied. By this arrangement, when an acceleration is applied along the axis of either accelerometer, the inductance in one coil increases and that of the other coil decreases, with the result that the voltage drops across the coils are no longer equal. Thus, a voltage that changes phase and varies in amplitude in accordance with the direction and the variations in magnitude of the applied accelerations $A_{nv}$ (or $A_{nh}$) appears at the output.

The output of accelerometer 139 is fed to an amplifier 155, having a gain $G_a$, whereby the output of amplifier 155 is $G_a A_{nv}$. Similarly, the output of accelerometer 140 is fed to an amplifier 160, also having a gain $G_a$, whereby the output of amplifier 160 is $G_a A_{nh}$.

In order to damp body oscillations of the missile, the system includes a rate gyroscope assembly to obtain measures of the angular rates of movement of the missile about its pitch and yaw axes and to provide stabilizing signals proportional thereto that are combined with the control signals fed to the control surfaces. Specifically, a rate gyroscope 165 (see Fig. 7) is arranged with its sensitive axis parallel to the missile pitch axis to measure the angular rate $\dot{\theta}_p$ of the pitch component of missile rotation, and a rate gyroscope 166 is arranged with its sensitive axis parallel to the missile yaw axis to measure the angular rate $\dot{\theta}_y$ of the yaw component of missile rotation.

Rate gyroscopes 165 and 166 are identical in construction and each comprises a rotor 167, having its spin axis parallel to the longitudinal axis of the missile, that is mounted for rotation in a gimbal 168 that is rotatably supported by torsional springs 169 that are mounted in a suitable base casting (not shown). An oil-filled damper 170 is provided at one end of gimbal 168 to prevent oscillations. Mounted on an arm fixed to an axial extension of gimbal 168 are two high-permeability iron armatures 171, each of which is separated by a small air gap from an associated inductance coil 172 wound on an E-shaped core member 173 mounted on the base casting, whereby, when coils 172 are energized from a suitable A.-C. source in the missile, there is provided an inductive pickoff device to produce a signal proportional to rotational movements of gimbal 168.

Coils 172 of each gyroscope 165 and 166 are connected in series and are excited by a suitable balanced-to-ground A.-C. voltage, from the missile power supply, to form a balanced inductance circuit, and the rate signal output of the circuit is taken from the junction of coils 172. As in the case of free gyroscope 110, driving power to bring the rotors 167 of rate gyroscopes 165 and 166 to operating speed is supplied from the parent aircraft when preparing for a launching operation and is cut off when the missile is launched, whereby rotors 167 coast at operating speed during the brief period of powered flight of the missile.

As employed in the system, gyroscopes 165 and 166 function as conventional rate gyroscopes in that each rotor 167 has freedom of movement about its spin axis and about its spring axis, or axis of support of gimbal 168, and is precessed about its spring axis when the assembly is rotated about its sensitive axis, i. e., the axis perpendicular to the spin and spring axes. As gimbal 168 deflects, the size of the air gaps between the associated elements 171 and 173 changes, thereby changing the reluctances of the associated magnetic paths. As a result, the inductance of one of the coils 172 increases and that of the other coil 172 decreases, whereby the output signal $\theta_p$ (or $\theta_y$) varies in magnitude proportionally to the rate of rotation of the missile about the sensitive axis of the gyroscope, and changes phase with respect to the exciting voltage in accordance with the direction of rotation of the missile.

The output $\theta_p$ of rate gyroscope 165 is fed to an amplifier 175, having a gain $G_{\dot\theta}$ whereby the output of amplifier 175 is $G_{\dot\theta}\theta_p$. Similarly, the output $\theta_y$ of rate gyroscope 166 is fed to an amplifier 176, also having a gain $G_{\dot\theta}$ whereby the output of amplifier 176 is G In order to apply the several control signals, described above, in a manner to effect the required control of the missile, the system includes suitable summing networks to combine the control signals, servo amplifiers to convert the combined control signals into a form for use in the control-surface servomechanisms, and hydraulic servo systems controlled thereby to actuate the missile control surfaces. Inasmuch as these functions may be performed by conventional devices, they are described but briefly below. Furthermore, since the means required to effect control about the missile yaw axis are identical to those required for control about the pitch axis, the following description is limited to a discussion of the yaw axis control as being illustrative of both.

During the motor burning phase of flight, the several signals required to effect control about the yaw axis namely $G_\theta\theta_y$, $G_aA_{nh}$, and $G_{\dot\theta}\dot\theta$ as derived above, are combined in a summing network and amplifier 178 to produce the required control signal $\delta_y$. In practice, the output signal of the summing network may be fed into an amplifier, the gain of which is controlled by a bias provided by a suitable gain control pressure gauge in the missile. The bias signal is a function of air density and missile velocity, whereby the gain of the amplifier varies in such a way that the guidance signal outputs, and thus the wing deflections, increase with decreasing velocity and rarer atmosphere so that the response of the missile is the same at any velocity or altitude.

The function of summing network and amplifier 178 is to combine each guidance signal with stabilizing feedback signals and the gain control bias in the correct proportion for proper operation of the missile servo system. The combination of signals may be accomplished by a passive resistance network, and the amplification may be provided by a two-stage feedback-stabilized amplifier circuit. The control signals are fed directly into the various resistors of the summing network, and the manner of combination of the signals is determined by their phase relationships. In the present embodiment, all the control signals are 2500-c. p. s. voltages which are either in phase or 180° out of phase with respect to a 2500-c. p. s. reference voltage generated by a power oscillator in the missile. Signals which are in phase add and those 180° out of phase subtract in the summing network.

From summing network 178, the control signal $\delta_y$ is fed to a servo amplifier 180 wherein it is combined with a control surface deflection feedback signal, and is then demodulated and amplified for use to actuate the control valve of the control surface actuating mechanism. Although a variety of devices may be used for this purpose, we have employed a phase inverter to combine the single-ended A.-C. input signals to the amplifier and to convert the resultant signal to a double-ended signal for use in a push-pull fashion. This signal is then applied to a demodulator to remove the 2500-c. p. s. carrier. The magnitude of the resulting D.-C. signal is proportional to the magnitude of the A.-C. input signal, and its polarity is determined by the phase relationship between the input signal and a 2500-c. p. s. reference voltage.

From servo amplifier 180 the demodulated signal $\delta_y$ is fed to a wing or control surface actuating assembly 183 wherein it is converted to a mechanical movement to effect the deflection of the yaw wings or control surfaces 95 in the sense and direction necessary for proper control of the missile after it is launched. Assembly 183 comprises a magnetically operated valve stroker assembly 185 which converts the electrical control signal $\delta_y$ into a mechanical motion, a hydraulic valve assembly 187 which is operated thereby and controls the flow of high pressure fluid from an accumulator 188, and a servo cylinder assembly 189 having a piston 190 that is actuated by such high pressure fluid and is connected by a link 191 and crank 192 to actuate a shaft 193 on which the yaw wings or control surfaces 95 are mounted. The signal outputs from amplifier 180 are applied directly to coils 194 and 195 of stroker assembly 185 and serve to position an armature 196 which is center suspended by a torsional spring 197 and is connected by a thin wire strut 198 to the valve stem 199 of valve assembly 187.

When equal currents flow in coils 194 and 195, as is the case when zero error exists in the missile servo system, equal magnetic forces center armature 196, which in turn holds valve stem 199 in its centered, or closed, position. When valve 187 is thus closed, hydraulic fluid cannot flow into or out of cylinder 189, and piston 190 is held in a fixed position by the fluid in the cylinder. When an error signal in the servo system causes a differential current in stroker coils 194 and 195, the magnetic forces at either end of armature 196 become unequal. The resulting deflection of the armature moves valve stem 199 from its center position, and hydraulic pressure is applied to one side of piston 190 while fluid from the opposite end of cylinder 189 is allowed to flow into an exhaust passage. As piston 190 moves under the hydraulic pressure, it positions control surfaces 95 in accordance with the control signal, and, at the same time, moves the wiper arm 201 of a feedback potentiometer 202 which is linked to the opposite end of piston 190. Feedback potentiometer 202 supplies a signal proportional to control surface position to servo amplifier 180, where it is subtracted from the control signal. Piston 190 moves until it reaches the point at which the signal from feedback potentiometer 202 is equal to the control signal. At this point the error in the servo system becomes zero, valve stem 199 returns to its center position, whereas, control surfaces 95 remain in their deflected position until another control signal is put into the system.

In the same manner, the pitch control signals $G_\theta \theta_p$, $G_a A_{nv}$, and $G_{\dot\theta} \dot\theta_p$ are combined in summing network 179 to produce the required control signal $\delta_p$ which is demodulated and amplified in servo amplifier 181 and is fed to control surface actuating assembly 184 wherein it is converted to a mechanical movement to effect the deflection of the pitch wings or control surfaces 90.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A flight control apparatus for a dirigible craft subject to substantially constant acceleration along its longitudinal axis comprising means for providing a signal dependent upon accelerations normal to the longitudinal axis of the craft, means for providing a signal dependent upon the angle of displacement of the longitudinal axis of the craft from a reference direction, means for combining such signals, a control surface for controlling the orientation of the craft longitudinal axis, and a servomotor coupled with said surface and controlled by said combining means for positioning said control surface in accordance with said signals such that the total craft acceleration is directed parallel to the reference direction.

2. A flight control apparatus for dirigible craft having a control surface for controlling the attitude of the craft about an axis thereof comprising accelerometer means mounted on said craft so as to respond only to accelerations normal to the longitudinal axis thereof for providing a signal dependent upon such accelerations, a gyroscope for providing a signal dependent upon the angle of displacement of the longitudinal axis of the craft from a reference direction, a summing network for combining such signals, and a servomotor coupled with said surface and responsive to the output of said summing means for positioning said control surface in accordance with said output.

3. A flight control apparatus for a dirigible craft subject to substantially constant acceleration along its longitudinal axis comprising an accelerometer for providing a signal dependent upon accelerations normal to the longitudinal axis of the craft, gyroscopic means for providing a signal dependent upon the angle of displacement of the longitudinal axis of the craft from a reference direction, a summing network for combining such signals, a control surface for rotating the craft longitudinal axis, and servomotor means controlled by said summing device for positioning said control surface such that the total craft acceleration is directed parallel to the reference direction.

4. A flight control apparatus for a dirigible craft subject to substantially constant acceleration along its longitudinal axis comprising an accelerometer for providing a signal dependent upon accelerations normal to the longitudinal axis of the craft, a gyroscope for defining a reference direction, pick-off means for said gyroscope for providing a signal dependent upon the angle of displacement of the longitudinal axis of the craft from the reference direction, a summing device for combining such signals, a control surface for positioning the craft longitudinal axis, and servomotor means controlled by said summing device for positioning said control surface such that the total craft acceleration is directed parallel to the reference direction.

5. A flight control apparatus for dirigible craft comprising means for measuring accelerations parallel to the longitudinal axis of the craft, means for measuring accelerations normal to the longitudinal axis of the craft, means for combining such measures of acceleration for providing a measure of the angle of total craft acceleration relative to the longitudinal axis, means for measuring the angle of displacement of the longitudinal axis of the craft from a reference direction, means for combining said total acceleration angle measure with said displacement angle measure, and means for actuating a craft control surface in accordance with the output of said combining means.

6. A flight control apparatus for a dirigible craft comprising a first accelerometer for measuring accelerations parallel to the longitudinal axis of the craft, a second accelerometer for measuring accelerations normal to the longitudinal axis of the craft, computing means for combining such measures of acceleration to provide a signal proportional to the angle of total craft acceleration relative to the longitudinal axis, gyroscopic means for providing a signal proportional to the angle of displacement of the longitudinal axis of the craft from a reference direction, a summing device for combining said signals, and means for actuating a craft control surface in accordance with the output of said summing device.

7. A flight control apparatus for a dirigible craft comprising a first accelerometer for measuring accelerations parallel to the longitudinal axis of the craft, a second accelerometer for measuring accelerations normal to the longitudinal axis of the craft, computing means for combining such measures of acceleration to provide a signal proportional to the angle of total craft acceleration relative to the longitudinal axis, gyroscopic means for providing a signal proportional to the angle of displacement of the longitudinal axis of the craft from a reference direction, a summing device for combining such signals, a control surface for positioning the craft longitudinal axis, and servomotor means controlled by said summing device for positioning said control surface such that said displacement angle signal is equal and opposite to said total acceleration angle signal.

8. In a dirigible craft intended for movement in a reference direction and having means for accelerating the craft in a direction substantially coincident with the longitudinal axis of the craft, the combination of means for defining a reference direction, means for providing a signal dependent upon the angular displacement of the longitudinal axis of the craft from the reference direction, means for providing a signal dependent upon accelerations normal to the longitudinal axis of the craft, means for combining such displacement and acceleration signals, and means controlled by the output of the last recited means for varying the orientation of the craft longitudinal axis whereby the resultant acceleration axis of the craft is directed parallel to the reference direction.

9. In a dirigible craft intended for movement in a reference direction and having means to accelerate the craft in a direction substantially coincident with the longitudinal axis of the craft, the combination of means for defining a reference direction, means for providing a signal dependent upon the angular displacement of the longitudinal axis of the craft from a reference direction, means for providing a measure of accelerations normal to the longitudinal axis of the craft, means for providing a measure of accelerations parallel to the longitudinal axis of the craft, means for combining such measures of acceleration to obtain a signal proportional to the angular displacement of the total craft acceleration relative to the longitudinal axis of the craft, means for combining such displacement and total acceleration signals, and means controlled by the output of the last recited means for varying the orientation of the craft longitudinal axis whereby the resultant acceleration axis of the craft is directed parallel to the reference direction.

10. In a dirigible craft intended for movement in a reference direction and having means for accelerating the craft in a direction substantially coincident with the longitudinal axis of the craft, the combination of a gyroscope for defining a reference direction, pick-off means for said gyroscope for providing a signal proportional to the angular displacement of the longitudinal axis of the craft from the reference direction, a first accelerometer for providing a measure of accelerations normal to the longitudinal axis of the craft, a second accelerometer for providing a measure of accelerations parallel to the longitudinal axis of the craft, computing means for combining functions of such measures of acceleration to obtain a signal proportional to the angular displacement of the total craft acceleration relative to the longitudinal axis of the craft, means for combining such displacement and total acceleration signals, and means controlled by the output of the last recited means for varying the orientation of the craft longitudinal axis whereby the resultant acceleration axis of the craft is directed parallel to the reference direction.

11. A flight control apparatus for dirigible craft comprising means for providing a first signal dependent upon accelerations normal to the longitudinal axis of the craft, means for providing a second signal dependent upon accelerations along the longitudinal axis of the craft, means for combining said first and second signals to obtain a third signal proportional to the angle of the total acceleration vector with respect to the longitudinal axis of the craft, means for providing a fourth signal dependent upon the angle of displacement of the longitudinal axis of the craft from a reference direction, means for combining said third and fourth signals, and means for actuating a craft control surface in accordance with the output of said last recited combining means.

12. A flight control apparatus for dirigible craft comprising means for providing a first signal dependent upon accelerations normal to the longitudinal axis of the craft, means for providing a second signal dependent upon accelerations along the longitudinal axis of the craft, means for combining said first and second signals to obtain a third signal proportional to the angle of the total acceleration vector with respect to the longitudinal axis of the craft, means for providing a fourth signal dependent upon the angle of displacement of the longitudinal axis of the craft from a reference direction, means for combining said third and fourth signals, a control surface for orienting the craft longitudinal axis, and means controlled by said last recited combining means to position said control surface such that the total craft acceleration is directed parallel to the reference direction.

13. A flight control apparatus to maintain the total acceleration vector of a dirigible craft parallel to a reference direction comprising means for establishing a reference direction, means for producing signals proportional respectively to the yaw and pitch components of angular deviations of the longitudinal axis of the craft from such reference direction, means for producing signals proportional respectively to the vertical and horizontal components of accelerations normal to the longitudinal axis of the craft, means for combining said yaw deviation signal and said horizontal acceleration signal to produce a first control signal, means for combining said pitch deviation signal and said vertical acceleration signal to produce a second control signal, yaw and pitch control surfaces for controlling the orientation of the craft longitudinal axis, and means for positioning said yaw and pitch control surfaces in accordance with said first and second control signals respectively.

14. A flight control apparatus to maintain the total acceleration vector of a dirigible craft parallel to a reference direction comprising means for establishing a reference direction, means for measuring deviations of the longitudinal axis of the craft from such reference direction, means for producing signals proportional respectively to the yaw and pitch components of such angular deviations, means for measuring accelerations normal to the longitudinal axis of the craft, means for producing signals proportional respectively to the vertical and horizontal components of such accelerations, means for combining said yaw deviation signal and said horizontal acceleration signal to produce a first control signal, means for combining said pitch deviation signal and said vertical acceleration signal to produce a second control signal, yaw and pitch control surfaces for controlling the orientation of the craft longitudinal axis, and means for positioning said yaw and pitch control surfaces in accordance with said first and second control signals respectively.

15. A flight control apparatus to maintain the total acceleration vector of a dirigible craft parallel to a reference direction comprising means for establishing a reference direction, means for producing signals proportional respectively to the yaw and pitch components of angular deviations of the longitudinal axis of the craft from such reference direction, means for producing signals proportional respectively to the yaw and pitch components of rates of angular deviation of the longitudinal axis of the craft from such reference direction, means for producing signals proportional respectively to the vertical and horizontal components of accelerations normal to the longitudinal axis of the craft, means for combining said yaw deviation signal and said yaw rate signal and said horizontal acceleration signal to produce a first control signal, means for combining said pitch deviation signal and said pitch rate signal and said vertical acceleration signal to produce a second control signal, yaw and pitch control surfaces for controlling the orientation of the craft longitudinal axis, and means for positioning said yaw and pitch control surfaces in accordance with said first and second control signals respectively.

16. A flight control apparatus to maintain the total acceleration vector of a dirigible craft parallel to a reference direction comprising means for establishing a reference direction, means for measuring deviations of the longitudinal axis of the craft from such reference direction, means for producing signals proportional respectively to the yaw and pitch components of such angular deviations, means for measuring rates of angular deviation of the longitudinal axis of the craft from such reference direction, means for producing signals proportional respectively to the yaw and pitch components of such rates of angular deviation, means for measuring accelerations normal to the longitudinal axis of the craft, means for producing signals proportional respectively to the vertical and horizontal components of such accelerations, means for combining said yaw deviation signal and said yaw rate signal and said horizontal acceleration signal to produce a first control signal, means for combining said pitch deviation signal and said pitch rate signal and said vertical acceleration signal to produce a second control signal, yaw and pitch control surfaces for controlling the orientation of the craft longitudinal axis, and means for positioning said yaw and pitch control surfaces in accordance with said first and second control signals respectively.

References Cited in the file of this patent

UNITED STATES PATENTS

| | | |
|---|---|---|
| 2,386,777 | Bently | Oct. 16, 1945 |
| 2,487,793 | Esval et al. | Nov. 15, 1949 |
| 2,595,309 | Slater | May 6, 1952 |
| 2,623,714 | Slater | Dec. 30, 1952 |
| 2,627,384 | Esval | Feb. 3, 1953 |
| 2,743,889 | White | May 1, 1956 |